United States Patent
Khosla et al.

(10) Patent No.: US 11,988,642 B2
(45) Date of Patent: May 21, 2024

(54) METHOD FOR DETERMINING HARDNESS OF A MATERIAL WITH IMPLEMENTATION OF THREE-DIMENSIONAL IMAGING

(71) Applicants: Vishal Khosla, San Jose, CA (US); Nick Doe, San Jose, CA (US); Michael Vinogradov-Nurenberg, San Jose, CA (US); Jun Xiao, San Jose, CA (US); Gautam Char, San Jose, CA (US)

(72) Inventors: Vishal Khosla, San Jose, CA (US); Nick Doe, San Jose, CA (US); Michael Vinogradov-Nurenberg, San Jose, CA (US); Jun Xiao, San Jose, CA (US); Gautam Char, San Jose, CA (US)

( * ) Notice: Subject to any disclaimer, the term of this patent is extended or adjusted under 35 U.S.C. 154(b) by 0 days.

(21) Appl. No.: 17/327,686

(22) Filed: May 22, 2021

(65) Prior Publication Data

US 2022/0373442 A1 Nov. 24, 2022

(51) Int. Cl.
  *G01N 3/06* (2006.01)
  *G01N 3/42* (2006.01)
  *G06T 7/60* (2017.01)
  *G06T 7/73* (2017.01)

(52) U.S. Cl.
  CPC ............ *G01N 3/068* (2013.01); *G01N 3/42* (2013.01); *G06T 7/60* (2013.01); *G06T 7/74* (2017.01); *G06T 2200/04* (2013.01); *G06T 2207/20072* (2013.01)

(58) Field of Classification Search
  CPC . G01N 3/068; G01N 3/42; G06T 7/60; G06T 7/74; G06T 2200/04; G06T 2207/20072
  See application file for complete search history.

(56) References Cited

U.S. PATENT DOCUMENTS

| 6,778,916 B2 | 8/2004 | Lee |
| 2014/0177937 A1 | 6/2014 | Ariga et al. |

FOREIGN PATENT DOCUMENTS

| DE | 4018333 A1 | | 12/1991 |
| DE | 102008034136 | * | 1/2010 |
| EP | 0 421 606 | * | 9/1990 |
| EP | 2 570793 | * | 3/2013 |
| FR | 2684184 | * | 5/1993 |
| JP | H7-181120 | * | 7/1995 |

(Continued)

OTHER PUBLICATIONS

Machine translation for TW 490551 (Year: 2002).*

(Continued)

*Primary Examiner* — Qian Yang (57) ABSTRACT

A method for determining hardness of a material by implementing 3D imaging is proposed. The imaging provides database of points on the 3D imprint in an orthogonal X-Y-Z coordinate system. An imaginary image of the imprint is formed by finding a plurality of intersection points obtained by intersecting the imprint image in X-Y plane with the X-Z plane movable in the Y-axis direction for obtaining a plurality of points of intersection that lay in the X-Y plane. Statistical processing of the plurality of the points of intersection makes it possible to form imaginary image of the imprint in the X-Y plane and to use the reference dimension of the obtained imaginary image as a parameter for insertion into the hardness calculation formula.

16 Claims, 4 Drawing Sheets

(56) References Cited

FOREIGN PATENT DOCUMENTS

TW 490551 * 6/2002

OTHER PUBLICATIONS

Machine translation for FR 2684184 (Year: 1993).*
Machine translation for DE 102008034136 (Year: 2010).*
Machine translation for JP H7-181120 (Year: 1995).*
Pan et al. "A new method for automatically measuring Vickers hardness based on region-point detection algorithm", Fourth International Symposium on Precision Mechanical Measurements, 2008, Anhui, China (Year: 2008).*
Yao et al., "An Automatic Hardness Measuring Method Using Hough Transform and Fuzzy c-means Algorithm", 2001 IEEE International Fuzzy Systems Conference (Year: 2001).*
Ji et al., "A New Method for Automatically Measurement of Vickers Hardness Using Thick Line Hough Transform and Least Square Method", 2009 2nd International Congress on Image and Signal Processing (Year: 2009).*
Vickers Hardness Test, Wikipedia, the free Encyclopedia, Figs. 1'A, 1B, 1C, and 1D.
Julia A. Khokhlova Ph.D., Department of physical-metallurgical processes of welding of light metals and alloys Paton Electric Welding Institute—National Academy of Sciences of Ukraine, Figs. 2A, 2B, and 2C.
Russian Article. Индентирование от макро- до нано- и примеры исследований свойств материалов с особой структурой. Method—Dec. 2016 DOI: 10.13140/RG.2.2.22072.96008, Department of Materials Science, Paton Electric Welding Institute, Kiev, Ukraine.

\* cited by examiner

METHOD FOR DETERMINING HARDNESS OF A MATERIAL WITH IMPLEMENTATION OF THREE-DIMENSIONAL IMAGING

FIELD OF THE INVENTION

The present invention relates to material testing, in particular to methods for measuring hardness of materials, and more specifically, to determination of hardness of materials with implementation of three-dimensional imaging.

BACKGROUND OF THE INVENTION

Historically, methods of quality control of metals and other materials, including determination of material hardness, have appeared and improved with development of material processing industry, and, at the present time, there exist many known methods for determining hardness of metals, alloys, and other materials. One of the widely spread methods is based on pressing into a test material an indenter under the action of a load (the load is applied smoothly). Such procedures are known as the methods of Brinell, Rockwell, Super-Rockwell, Vickers, Hertz, Ludwick, Shor's monotron, etc.

All direct methods for measuring hardness are based on the ability of a material to resist the penetration of another, more solid body—the indenter. The indenters are made in the shape of cones or pyramids of diamond, or in the shape of a ball made of hardened steel or tungsten carbide. The methods of indentation are based on the dependence between the applied force and certain geometric parameters of the indentation, e.g., by measuring a distance between edges of hardness measurement impressions. For example, in a Brinell hardness test, the Brinell hardness value is proportional to the test force divided by the surface area of the indentation. For the Brinell test, the test procedures require that the surface area be determined by measuring the indentation diameter after removing the test force. However, the indentation process is accompanied by plastic deformations of the test material, which is most essential on the edges of the imprint. Therefore, measurement of the diameter or any other control dimension of impression obtained in determination of control dimension on a 2D image involves an error.

Attempts have been made to improve detection of edges in determination of hardness by measuring a reference dimension. See, for example, German Patent Application Publication DE4018333A1 (Inventors: J. Schiller, et al.; published on Dec. 12, 1991). This publication describes a method for automatic detection of edges of hardness measurement impressions by using maximum contrast illumination video imaging and evaluating by threshold comparison, then differentiating contour pulses. The geometric data are derived by a computer, e.g. to obtain a diagonal of the impression or its surface area.

Known in the art also are methods and apparatuses for determining hardness of materials based on the dependence of hardness from elastic modulus and a yield strength of the material being tested. Thus, U.S. Pat. No. 6,778,916B2 issued on Aug. 17, 2004 to H. Lee discloses an automated indentation system utilizing a finite element analysis or performing a non-destructive compression test applying a compressive indentation load and calculating an elastic modulus, a yield strength, and a hardening exponent from the measured indentation depth, and indentation load, and the unloading slope. The system includes a stepmotor control system, a measurement instrumentation with a load cell, laser displacement sensor for measuring the indentation depth, a ball indenter, a data acquisition system with a signal amplifier for amplifying and filtering signals from the load cell and the laser displacement sensor, and a pre-stored computer programming algorisms for adjusting and controlling the moving speed and a stepmotor direction. Based on the signal data, the graphs of load-depth curve and stress-strain curves are plotted. The procedure of computer programming algorithm is as follows: First, the Young's modulus E is computed from a certain equation by using slope and initially guessed values of hardening exponent n and yield strain $\varepsilon_0$. Then, indentation variables $c^2$ and $\varepsilon_p$ and yield strength σ are calculated as many as the number of load and depth data, etc. The updated values of certain parameters are repeatedly calculated until the updated $\varepsilon_0$ and n are converged within the tolerance, where $\varepsilon_0$ is a yield strain.

U.S. Patent Application Publication No. 20140177937 (Inventors: Kozo Ariga, et al., Publication Date: Jun. 26, 2014) discloses a hardness tester and method for hardness test. The hardness tester includes a data obtainer that obtains a sample shape data that can specify a shape of a sample; an image capture controller for controlling a CCD camera to capture an image of the surface of the sample and obtaining image data of the sample; a matching performer associating the sample shape data obtained by the data obtainer with the image data of the sample obtained by the CCD camera; an indentation former that forms an indentation with an indenter in a test position set on the sample shape data after the sample shape data and the image data of the sample have been associated by the matching performer; and a hardness value calculator calculating a hardness value of the sample based on the indentation captured with the CCD camera after the indentation has been formed by the indentation former.

However, all the existing methods and devices for determining hardness by involving 2D photo-imaging cannot provide finding an exact reference dimensions, e.g., such as an imprint diameter in the Brinell test or a diagonal dimensions in the Rockwell test, without excluding the influence of the raised portion of the material that remain on the edges of the imprint upon removal of the indenter.

Figure 1A:
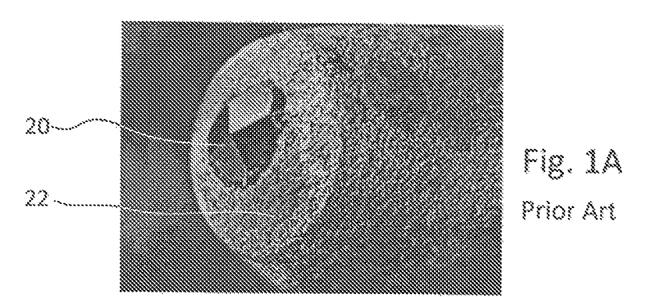
FIG. 1A is a photograph of a diamond Vickers indenter secured in a tool-holding cartridge.
Figure 1B:
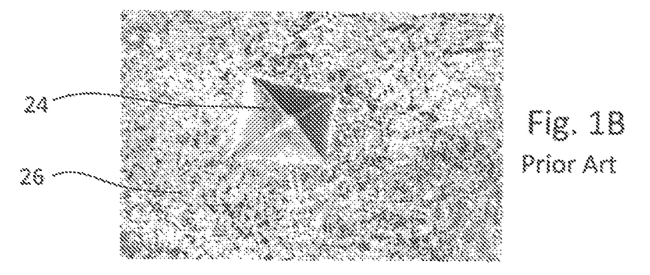
FIG. 1B is a photograph of an imprint formed by the Vickers indenter of FIG. 1A in a stainless steel sample.
Figure 1C:
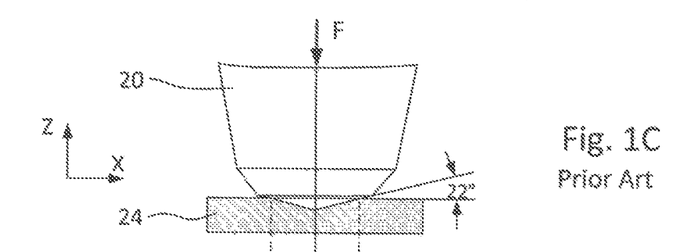
FIG. 1C is a schematic side view of the diamond Vickers indenter in the final position of pressing into the sample.
Figure 1D:
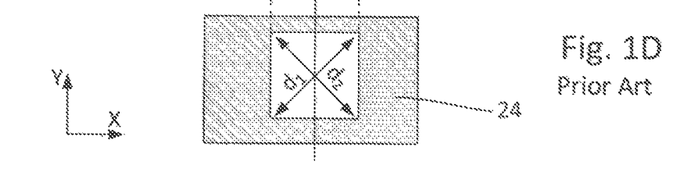
FIG. 1D is a schematic top view of the imprint obtained by pressing the indenter of FIG. 1C into the sample material.

The aforementioned statement may be illustrated by the following explanation with reference to some drawings, wherein FIG. 1A is a photograph of a diamond Vickers indenter 20 secured in a tool-holding cartridge 22, FIG. 1B is a photograph of an imprint 24 formed by the Vickers indenter 20 of FIG. 1A in a stainless steel sample 26, FIG. 1C is a schematic side view of the diamond Vickers indenter 20 in the final position of indentation into the sample 26, and FIG. 1D is a schematic top view of the imprint 24 (see Vickers Hardness Test, Wikipedia, the free Encyclopedia).

Accordingly, loads of various magnitudes are applied to a flat surface, depending on the hardness of the material to be measured. The HV number (Vickers hardness value) is then determined by the ratio F/A, where F is the force applied to the diamond in kilograms-force and A is the surface area of the resulting indentation in square millimeters. A can be determined by the by the following formula:

$A \approx d^2/1.8544$, where d is the average length of the diagonal left by the indenter in millimeters (see $d_1$ and $d_2$ in FIG. 1D). F is a force in terms of kgf, and d is a diagonal dimension in millimeters.

The corresponding unit of HV is calculated, e.g., by the formula: $F/A \approx 1.8544 F/d^2 (kgf/mm^2)$ or in the SI system by the formula (1)

$$HV \approx 0.1891 F/d^2 (Kgf/mm^2) \qquad (1)$$

To convert the Vickers hardness number to SI units, the hardness number in kilograms-force per square millimeter (kgf/mm$^2$) has to be multiplied with the standard gravity (9.80665) to get the hardness in MPa (N/mm$^2$) and furthermore divided by 1000 to get the hardness in GPa. Vickers hardness can also be converted to an SI hardness based on the projected area of the indent rather than the surface area. The projected area $A_p$, is defined as the following for a Vickers indenter geometry [formula (1)]

$$A_p = d^2_{avg}/2 \tag{2}$$

In case of the Brinell test, an indenter is a tungsten carbide ball or a steel ball. The Brinell test is used for measuring hardness of relatively soft materials. The typical test uses a 10 mm ball with application of q 3,000 kgf (29.42 kN) force. For softer materials, a smaller force is used; while a tungsten carbide ball is used for harder materials. The following formula (2) is used for calculating the Brinell hardness BHN:

$$BHN = 2P/\{\pi D - [D - (D^2 - d^2)^{1/2}]\} \tag{3}$$

where:
BHN = Brinell Hardness Number (kgf/mm$^2$)
P = applied load in kilogram-force (kgf)
D = diameter of indenter (mm)
d = diameter of indentation (mm).

As can be seen from the above formula, determination of "d", i.e., the diameter of the imprint on the surface of the sample being tested, is measurement of the main parameter needed for calculation of the Brinell hardness BHN.

Tests of other types that are used for testing the materials for hardness also involve determination of geometric parameters of the imprints. The procedures used in such hardness measurements are associated with the analysis of 2D images of the imprint and results in inevitable inaccuracies in the determination of the main geometric parameter.

SUMMARY OF THE INVENTION

The present invention relates to material testing, in particular to methods for measuring hardness of materials. Two-dimensional photo-imaging does not allow obtaining accurate geometric parameter, e.g., by measuring a diameter of imprint in case of the Brinell test or diagonal dimension in case of Vickers test, for insertion into a standard formulas for hardness calculation.

The method of the present invention solves the above problem by implementing into the determination of hardness the database obtained by three-dimensional imaging (3D imaging).

More specifically, the method of the invention consists of the following steps:
a) providing a sample to be tested having an intact surface;
b) making an imprint in the intact surface of the sample by an indentation process in which an indenter is pressed into the intact surface of the sample by applying an indentation force, the imprint having an imprint image;
c) measuring the indentation force during the indentation process;
d) releasing the indentation force;
e) removing the indenter away from the imprint;
f) obtaining a 3D image of the imprint with the use of an optical system that produces a 3D image of the imprint with an image processor, which can present points on the imprint in the form of a database in a selected orthogonal coordinate system formed by three mutually perpendicular X-axis, Y-axis, and Z-axis;
g) determining a position of the intact surface of the sample beyond the imprint in the aforementioned coordinate system;
h) finding a first pair of points of intersection of an arbitrarily positioned at least of an X'-axis, which is formed by shifting at lkeast the X-axis in a plane-parallel motion in the direction of the Y-axis across the imprint in a X-Y plane of the intact surface, said first pair of points of intersection coinciding with respective points of the database;
i) repeating the steps h) n times, where n≥2 for finding n pairs of points of intersections;
j) forming, based on the n points of intersection, a virtual image of the imprint in the X-Y plane of the intact surface;
k) determining from the virtual image of the imprint a reference dimension needed for use in a standard formulas for hardness calculation; and
l) calculating the hardness by standard formulas for hardness calculation by using the reference parameter.

DETAILED DESCRIPTION OF THE INVENTION

As mentioned above, the inaccuracies that occur in measuring hardness are caused by basing the analysis on 2D imaging. These inaccuracies occur because during indentation, a material is subject to plastic deformations and goes beyond the yield point, and when the indenter is extracted from the test material, edges of the indent are raised, and therefore it becomes impossible to accurately measure a linear reference dimension, e.g., a diameter or diagonal of the imprint, on a planar picture.

Figure 2A:
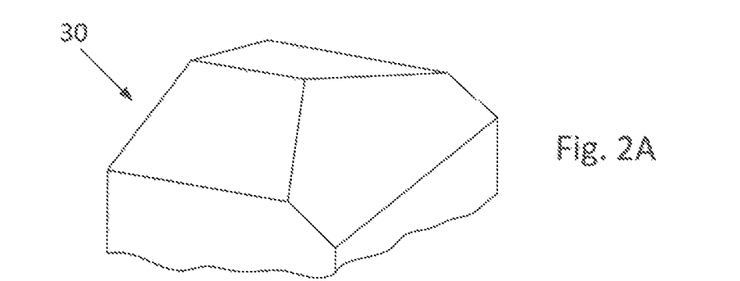
FIG. 2A is top view of a three-facet Berkovich indenter.
Figure 2B:
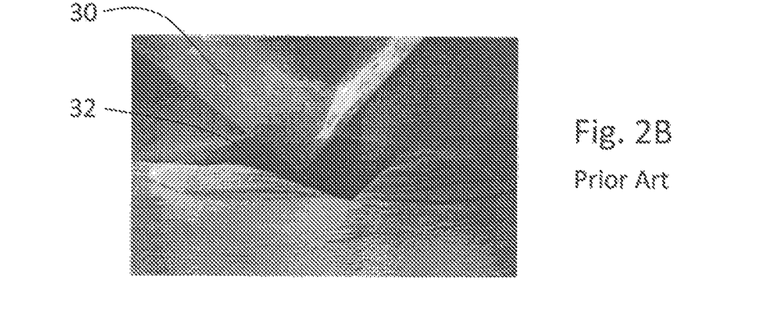
FIG. 2B is a view of the indenter just removed from imprint.
Figure 2C:
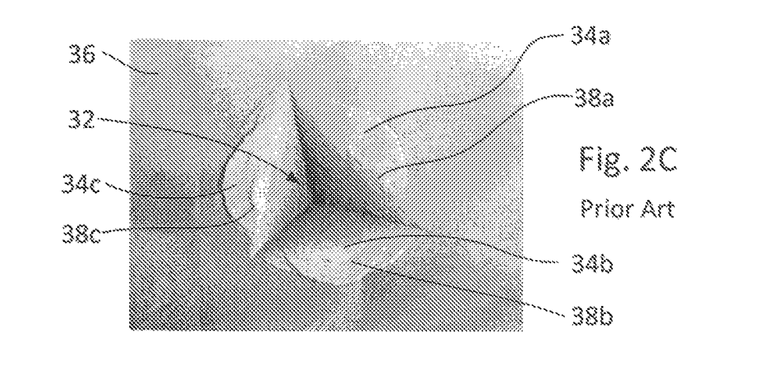
FIG. 2C is a top view of the imprint obtained as a result of the indentation.

This statement is well illustrated by photos (see: Julia A. Khokhlova Ph.D., Department of physical-metallurgical processes of welding of light metals and alloys Paton Electric Welding Institute—National Academy of Sciences of Ukraine) shown in , FIGS. 2A, 2B, and 2C, FIGS. 2A, 2B, and 2C, where FIG. 2A is top view of a three-facet Berkovich indenter 30, FIG. 2B is a view of the indenter 30 just removed from the indent 32, and FIG. 2C is a top view of the imprint 32 obtained as a result of the indentation. As can be seen from FIG. 2C, the imprint shows formation of raised portions 34a, 34b, and 34c on the sample surface 36 around the edges 38a, 38b, and 38c of the indent.

All these observations led the inventors herein to a method for determining hardness of a material that allows ignoring the aforementioned deformations, i.e., the raised portions, by analyzing a three-dimensional (hereafter referred to as "3D") image of the imprint as well as the 3D shape of the indenter.

The method of the invention for determining hardness of materials with implementation of three-dimensional imaging is based on an assumption that after release of the load, the area of the imprint near the bottom is subject to deformation in a lesser degree than at the upper part of the imprint, especially where raised portions are formed at the imprint edges. This is important for subsequent measurement of the imprint depth. Furthermore, upon release of the load, all portions of the imprint are resiliently deformed. However, the relatively insignificant deformations on the bottom of the imprint can be excluded from the consideration.

The method is carried out in the following manner.

First, if necessary, a sample is subject to surface finishing, e.g., to almost mirror surface quality. Then an imprint is formed on the surface of a sample by pressing an appropriate indenter into the surface of the sample of the material being tested. The imprint can be produced by using an indenter of any indentation type such as Brinell, Rockwell, Super-Rockwell, Vickers, Hertz, Ludwick, Shor's indenters, etc. The imprinting process involves constant measuring an indentation force applied to the sample during the indentation process.

Next step is obtaining a 3D image of the imprint with the use of a high-resolution microscopic optical system with a video sensor of high resolution and an image processor, which can present points on the imprint in the form of a database in a selected orthogonal coordinate system formed by three mutually perpendicular X-axis, Y-axis, and Z-axis.

The database represents all points on the surface of the imprint, including the lowermost one, which is needed for defining the depth of the imprint.

It is understood that the imprint is a recess that reflects the shape of the respective indenter and may have a spherical, conical, pyramidal, or any other respective shape. Nevertheless, the principle of the invention is applicable to the indenters of any type. The indenters may have a shape of bodies of revolution, i.e., spherical bodies, or a multi-facet-shape, e.g., a pyramidal shape.

The origin of the coordinate system may be selected arbitrarily but the most convenient positions for the coordinate system origin is a point of intersection of the vertical axis of the imprint (Z-axis) with the intact plane of the sample. Alternatively, the point of origin may be positioned in the lowermost point of the imprint, which corresponds to the point of contact of the indenter apex with the material of the samples after removal of the indenter.

The next step is determining a position of the intact surface of the sample into which the indenter is pressed to form an indent. This position should be determined in the aforementioned orthogonal coordinate system, wherein the X-axis may assume any arbitrary position over the imprint image in the X-Y plane of the intact surface of the sample.

Next step is finding points of intersection of the arbitrarily positioned X'-axis in the X-Y plane of the sample surface with the points that coincide with the respective points of the 3D image database of the imprint. This step is then repeated for another position of the X'-axis shifted in the direction of the Y-axis, and so on n-times, where n is $\geq 2$. In other words, the surface of the sample is scanned (laterally traced) by moving the X'-axis in the Y-axis direction, and positions of intersection of a current X'-axis with the points of the database of the 3D image of the imprint are determined for each shift of the X-axis. In fact, the current X'-axis is a line of intersection of the current vertical plane X'-Z with the horizontal plane X-Y in which the imprint image lays. Each such shift of the X'-axis is lateral tracing of the imprint image that produces a pair of points of intersection of the X'-axis with the imprint image, and after n lateral tracings, n pairs of the points of intersections are obtained in the X-Y plane.

Since it is assumed that all these points of intersection lays on the image surface of the imprint in plane X-Y, the n-combinations of such pairs of points makes it possible to form a virtual image of the imprint on the X-Y plane. The greater is the value of n, the more data is obtained for forming the aforementioned virtual image and more accurately formed may be the virtual image. The virtual image is obtained by statistical processing of the n-pairs of the points of intersection for finding an image having outlines, which have minimal deviations of the imprint image from the virtual image.

The obtained virtual image of the imprint in the X-Y plane built on the basis of the obtained points of intersection is used for determining a reference dimension needed for use in a standard hardness calculation formulas based on dependence of hardness from the indentation force and the geometric parameter. In case of the Brinell test, the outlines of virtual image form a circle and the geometric parameter is a diameter or a radius of the circle. In case of the Vickers test, the virtual image has outlines in the form of a square, and the reference dimension is a diagonal between the opposite corners of the square. The obtained reference dimension is then used for calculating the hardness by the respective hardness calculation formula.

In general, the virtual image is obtained as results of statistical processing of the n-pairs of the points of intersection for finding an image having outlines, which have minimal deviations of the imprint image from the virtual image.

Although indenters of all types are subordinate to the common principle of the invention described above, let us consider specificity of the method with respect to imprints of spherical and pyramidal shapes separately. Let us first consider a case of a spherical indenter inherent in the Brinell method. After finishing the surface of the sample 38 as described above, an imprint 40 is formed by indenting the spherical indenter (not shown in FIG. 3A) into the sample material.

Figure 3A:
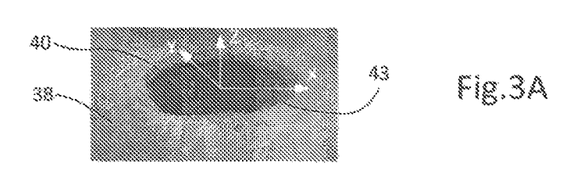
FIG. 3A is a photographic image of the indent of an imprint obtained by the applicants in a Brinell test.

FIG. 3A is a photographic image of the imprint obtained by the applicants in the Brinell test. The imprint 40 has a surface close to a concave spherical shape.

Next step is finding the intersection of the arbitrarily positioned X1'-axis with the points C1 and C2 of the imprint in the X-Y plane of the material sample, these points C1 and C2 coinciding with the points contained in the database obtained in the 3D imaging process and stored, e.g., in the computer memory. The position of the current X1'-X1' axis that intersects the imprint 40 as well as points C1 and C2 are shown in FIG. 3B.

Figure 3B:
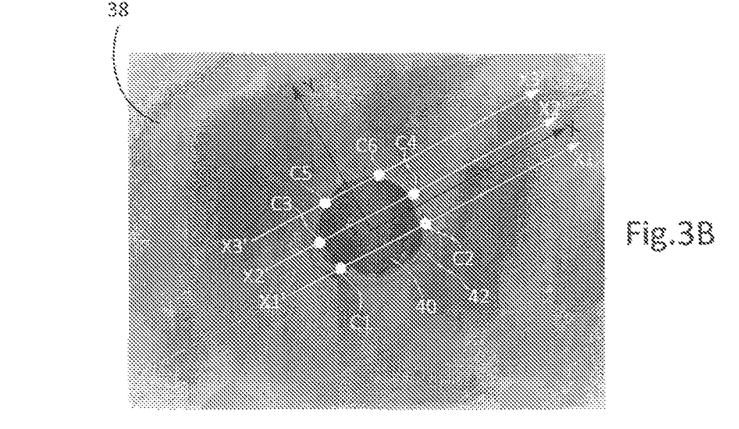
FIG. 3B is a top view of the imprint of FIG. 3A that shows positions of intersection of the arbitrarily positioned X1'-axis with the points C1 and C2 that form the 3D image of the indent and that are obtained in the 3D imaging process and stored in the computer memory as a 3D image data base.

The positions of the points C1 and C2 are shown in FIG. 3B conventionally, and an actual procedure of finding these points is described below with reference to FIG. 3C, which is a graph that on the abscissa axis shows points of intersection of the plane X1'-Z with the 3D imprint image, which coincide with respective points of the database.

The step described above is then repeated for another position of the plane X2'-Z, which is obtained after the X1'-Z plane is shifted in a plane-parallel motion in the direction of the Y-axis. This move is illustrated by the axis X2'-X2' that produces another pair of point of intersection with the imprint image. Then the same is done for obtaining the position of the X3'-axis, and so on n-times where n is equal to or greater than 2 (FIG. 3B). As a results, point pairs C3-C4, C5-C6, ... C(n-1)-Cn are obtained.

Figure 3C:
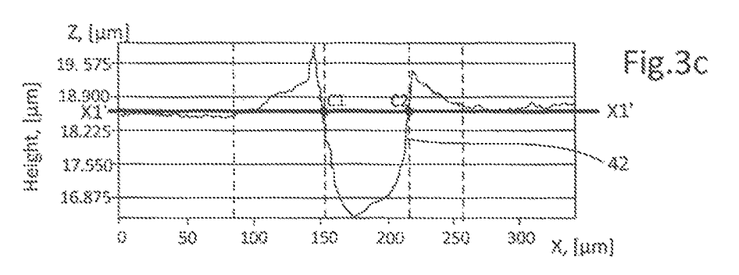
FIG. 3C is a graph of the imprint profile that on the abscissa axis shows coordinates of cross-sections of the imprint image with the movable X-Z plane in the direction of Y-axis across the imprint image and the ordinate axis shows positions of the points of intersection of the X-Z plane with imprint image in the Z-axis direction, wherein the imprint has a spherical shape.

The graph of FIG. 3C is a result of cross section of the image of the imprint 40 with the X1'-Z plane, whereby a curve 42 is plotted, the image of the curve has different scales along axes X and Z. These scales may have, for example, a 10-fold difference.

Thus, the method of the invention makes it possible to find the multiple points of intersection of the moveable X-axis with the imprint image. A provision of these point pairs C1-C2, C3-C4, C5-C6, etc., makes it possible to form a virtual image of a circumference is a cross section of the 3D imprint image with the X-Y plane. Thus, it is possible to exclude the effect of the raised portion 43. In the case of the Brinell test, the virtual image is a circle 41 (FIG. 3B). A diameter of this circle 41 constitutes a sought reference dimension needed for the insertion into the formula (3) and obtained without the effect of the raised portions on the edge 43 (FIG. 3A) of the imprint.

Figure 4A:
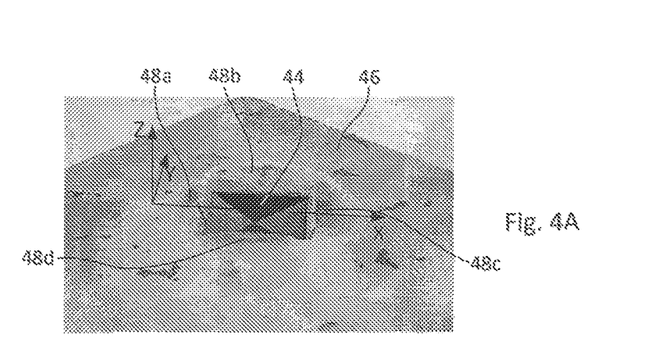
FIG. 4A shows an imprint obtained by the applicants as a result of indentation of the material of the sample with a four-facet indenter.

Let us now consider a case of a non-spherical indenter, e.g., a multi-facet-type indenter such as a four-facet pyramidal Vickers indenter. The imprint 44 obtained as a result of indentation of the material of the sample with a four-facet indenter (not shown) into the surface 46 of the sample is shown in FIG. 4A. The raised portions 48a, 48b, 48c, and 48d are clearly seen in FIG. 4A, which is a photographic image of a real imprint obtained by the applicants in the Vickers hardness test.

Figure 4B:
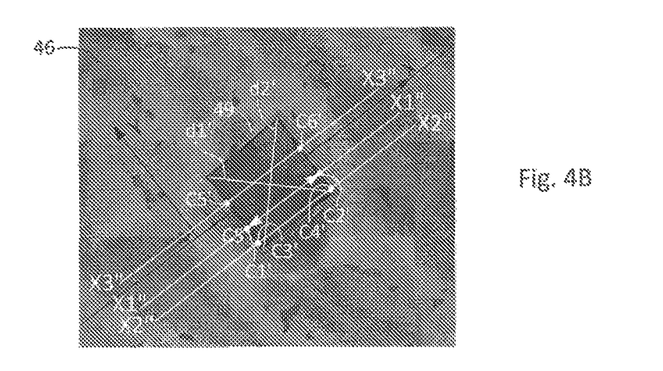
FIG. 4B is a top view of the imprint of FIG. 4A.

FIG. 4B is a top view of the imprint 44 of FIG. 4A. The imprint 44 has a surface close to the indent produced by the upper end of a four-facet pyramid, which is defined by four downward-tapered plane facets.

In fact, the method of the invention is carried out in the same manner as in the case of the spherical imprint of the Brinell test with the different that the moveable X-axis assumes different current positions X1"-X1", X2"-X2", X3"-X3", etc., shown in FIG. 4B.

Next step is finding those points C1" and C2" of intersection of the arbitrarily positioned X1"-Z plane with the image of the imprint in the X-Y plane of the intact surface of the sample, which coincide with the respective points of the database that define the 3D image of the pyramidal imprint.

The positions of the points C1' and C2' are shown in FIG. 4B conventionally, and an actual procedure of finding these points is described below with reference to FIG. 4C, which is a graph of the imprint profile that on the abscissa axis shows coordinates of cross-sections of the imprint image with the movable X-Z plane in the direction of Y-axis across the imprint image and the ordinate axis shows positions of the points of intersection of the X-Z plane with imprint image in the Z-axis direction, wherein the imprint has a four-faced pyramidal shape.

The step described above is then repeated for another position of the plane X2"-Z, which is obtained after the X1"-Z plane is shifted in a plane-parallel motion in the direction of the Y-axis. Then the same is done for obtaining the position of the X3'-axis, and so on n-times where n is equal to or greater than 2 (FIG. 4B). As a results, point pairs C3'-C4', C5'-C6', ... C'(n-1)-C'n are obtained.

Figure 4C:
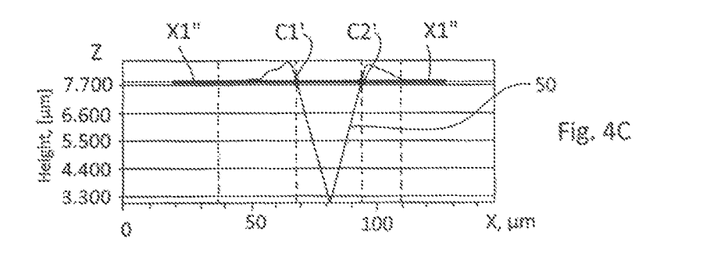
FIG. 4C is a graph of the imprint profile that on the abscissa axis shows coordinates of cross-sections of the imprint image with the movable X-Z plane in the direction of Y-axis across the imprint image and the ordinate axis shows positions of the points of intersection of the X-Z plane with imprint image in the Z-axis direction, wherein the imprint has a four-faced pyramidal shape.

The graph of FIG. 4C is a graph of the imprint profile that on the abscissa axis shows coordinates of cross-sections of the imprint image with the movable X-Z plane in the direction of Y-axis across the imprint image and the ordinate axis shows positions of the points of intersection of the X-Z plane with the 3D imprint image in the Z-axis direction, wherein the imprint has a four-faced pyramidal shape. The ordinate and abscissa scales may have, for example, a 10-fold difference.

Thus, the method of the invention makes it possible to find the multiple points of intersection of the moveable X-axis with the 3D imprint image. A provision of these point pairs C1'-C2', C3'-C4', C5'-C6', etc., makes it possible to form a virtual image of the imprint in the X-Y plane, a square 49 (FIG. 4B) in case of the Vickers test.

Diagonals $d'_1$ and $d''_2$ of this square 49 constitute the sought reference dimensions needed for the insertion into the formula (1) and obtained without the effect of the raised portions 48a, 48b, 48c and 48d on the edges of the imprint.

The greater is the value of n, the more accurate result may be obtained for finding the reference dimensions needed for insertion into the hardness calculation formula for a Vickers test.

Although the method of the invention was described by specific steps with reference to specific drawings that illustrate the method with indenters and imprints of specific shapes, it is understood that the description and the drawings should not be construes as limiting the present invention and that any changes and modifications are possible within the scope of the attached patent claims. The 3D imaging allows obtaining geometric parameters other than a diameter and diagonal, if these parameters are suitable for use in formulas for calculating the hardness. For improving more accurate hardness measurement results, multiple reference dimensions obtained by the method of the invention after n-times of lateral tracing can be processed by various methods of statistics. Although the, method of the invention was exemplified only with regard to Brinell and Vickers test, the method is applicable also to Berkovich, Super-Rockwell, Hertz, Ludwick, Shor's monotron, etc. The method of the invention is applicable for measuring nanohardness, microhardness, and macrohardness. The method is applicable for measuring hardness in solid material and in coatings. The coordinate system used for determining geometrical parameters of the 3D image of the imprint may be different from the orthogonal coordinate system. Although the imprint image was virtually scanned (laterally traced) by moving the X'-axis in the Y-axis direction, the invention also covers lateral tracing the imprint image by moving a Y'-axis in the X-axis direction. The procedures of virtually scanning the imprint image in the direction of both axes X and Y are identical. Since the database obtained by the 3D imaging with the system of the invention provides coordinates of any point of the imprint, it is understood that the position of the lowermost point, i.e., the depth of the imprint, is also available if needed for use in hardness calculation methods.

The invention claimed is:

1. A method for determining hardness of a material with implementation of three-dimensional imaging, the method comprising the steps of:
    a) providing a sample to be tested having an intact surface;
    b) making an imprint in the intact surface of the sample by an indentation process comprising a step of pressing an indenter into the intact surface of the sample by applying an indentation force to the indenter, the imprint having an imprint image;
    c) measuring the indentation force during the indentation process;
    d) releasing the indentation force;
    e) removing the indenter away from the imprint;
    f) obtaining a 3D image of the imprint with the use of an optical system that produces a 3D image of the imprint with an image processor, wherein the image processor presents points on the imprint in the form of a database in a selected orthogonal coordinate system formed by three mutually perpendicular X-axis, Y-axis, and Z-axis;
    g) determining a position of the intact surface of the sample beyond the imprint in the aforementioned coordinate system;
    h) finding a first pair of points of intersection of an arbitrarily positioned an X1' axis, the X1' axis being formed by shifting at least the X-axis in a plane-parallel motion in the direction of the Y-axis across the imprint in a X-Y plane of the intact surface, said first pair of points of intersection coinciding with respective points of the database;
    i) repeating the steps h) n times, where n≥2 for finding n pairs of points of intersection;
    j) forming, based on the n pairs of points of intersection, a virtual image of the imprint in the X-Y plane of the intact surface;
    k) determining from the virtual image of the imprint a reference dimension needed for use in standard formulas for hardness calculation; and
    l) calculating the hardness by the standard formulas for hardness calculation by using the reference dimensions.

2. The method according to claim 1, wherein the virtual image comprises results of statistical processing of the n-pairs of the points of intersection for finding an image having outlines which have minimal deviations of the imprint image from the virtual image.

3. The method according to claim 2, wherein the indenter is selected from the group consisting of indenters having a shape of bodies of revolution and indenters of multi-facet-shape.

4. The method according to claim 3, wherein the bodies of revolution are spherical bodies, and the indenters of multi-facet-shape are pyramidal bodies.

5. The method according to claim 4, wherein the steps j) and k} are accomplished by forming a graph that has an abscissa axis that shows plane-parallel displacements of a moveable X-Z plane in the direction of the Y-axis across the imprint image that lays in the X-Y plane and an ordinate axis that shows positions of selected points in the direction of the Z-axis, the plane-parallel displacements being performed n times for obtaining said n pairs of points of intersections.

6. The method according to claim 4, wherein the spherical bodies are Brinell test indenters and the pyramidal bodies are Vickers test indenters.

7. The method according to claim 4, wherein the virtual image comprises results of statistical processing of the n-pairs of the points of intersection for finding an image having outlines which have minimal deviations of the imprint image from the virtual image.

8. The method according claim 3, wherein the steps j) and k) are accomplished by forming a graph that has an abscissa axis that shows plane-parallel displacements of a moveable X-Z plane in the direction of the Y-axis across the imprint image that lays in the X-Y plane and an ordinate axis that shows positions of selected points in the direction of the Z-axis, the plane-parallel displacements being performed n times for obtaining said n pairs of points of intersections.

9. The method according to claim 8, wherein the virtual image comprises results of statistical processing of the n-pairs of the points of intersection for finding an image having outlines which have minimal deviations of the imprint image from the virtual image.

10. The method according to claim 3, wherein the virtual image comprises results of statistical processing of the n-pairs of the points of intersection for finding an image having outlines which have minimal deviations of the imprint image from the virtual image.

11. The method according claim 2, wherein the steps j) and k) are accomplished by forming a graph that has an abscissa axis that shows plane-parallel displacements of a moveable X-Z plane in the direction of the Y-axis across the imprint image that lays in the X-Y plane and an ordinate axis that shows positions of selected points in the direction of the Z-axis, the plane-parallel displacements being performed n times for obtaining said n pairs of points of intersections.

12. The method according to claim 11, wherein the virtual image comprises results of statistical processing of the n-pairs of the points of intersection for finding an image having outlines which have minimal deviations of the imprint image from the virtual image.

13. The method according to claim 2, wherein the virtual image comprises results of statistical processing of the n-pairs of the points of intersection for finding an image having outlines which have minimal deviations of the imprint image from the virtual image.

14. The method according claim 1, wherein the steps j) and k) are accomplished by forming a graph that has an imprint profile, and shows on an abscissa axis coordinates of cross-sections of the imprint image with a movable X-Z plane that is shifted in a direction of Y-axis across the imprint image and the ordinate axis shows positions of the n pairs of points of intersection of the movable X-Z plane with the imprint image in a Z-axis direction, wherein the imprint image has a four-faced pyramidal shape.

15. The method according to claim 14, wherein the virtual image comprises results of statistical processing of the n-pairs of the points of intersection for finding an image having outlines which have minimal deviations of the imprint image from the virtual image.

16. The method according to claim 1, wherein the virtual image comprises results of statistical processing of the n-pairs of the points of intersection for finding an image having outlines which have minimal deviations of the imprint image from the virtual image.

* * * * *